3,623,903
METHOD FOR PRODUCING LIGHT-CONDUCTING SYSTEMS, PARTICULARLY FOR ULTRAVIOLET LIGHT
Helmut Dislich, Mainz-Gosenheim, and Alfred Jacobsen, Mainz, Germany, assignors to JENAer Glaswerk Schott & Gen., Mainz, Germany
No Drawing. Continuation of application Ser. No. 640,514, May 23, 1967. This application May 12, 1970, Ser. No. 36,696
Claims priority, application Germany, June 8, 1966, J 31,023
Int. Cl. C03c 25/02; G02 1/10
U.S. Cl. 117—124 E                                    2 Claims

ABSTRACT OF THE DISCLOSURE

Light conducting systems, particularly for ultraviolet light are produced by coating quartz glass rods and fibres with a synthetic resin having an index of refraction which is smaller than the material to be coated; the synthetic resin comprising a transparent, highly fluoridized, aliphatic synthetic substance, preferably a mixed-polymerizate made from tetrafluoroethylene and hexafluoropropylene.

---

The invention relates to light-conducting systems and is a continuation of our application Ser. No. 640,514 filed May 23, 1967, now abandoned.

In the production of light-conducting systems, particularly for ultraviolet light, in which light-permeable glass-rods or fibres, respectively, for ultraviolet light rods or fibres are made of quartz glass, it is known to coat the fibres with a synthetic resin whose index of refraction is smaller than that of the coated material, in fact the material is coated with a synthetic resin at least a few wavelengths thick in optical contact with the base material. This method is described in the U.S. patent application Ser. 560,084 filed on June 24, 1966 by Dislich and Jacobsen, now Pat. 3,480,458.

It has been found that with the synthetic resins indicated in the known methods, particularly with polysiloxanes applied to quartz-glass-cores aperture angles $2\alpha_0$ of 30° are obtained in the ultraviolet range, while when this resin is applied to glass-core having an index of refraction $n_{546}=1.62$, at this wave-length an aperture angle of 100° is obtained.

It was now found that substantially still larger aperture angles can be attained, if as a synthetic resin is employed a transparent, highly fluoridized, aliphatic synthetic resin, preferably a mixed-polymerizate made of tetrafluoroethylene and hexafluoropropylene. From quartz glass cores there is obtained, in place of the aperture angle of 30° mentioned above, such an angle of 65° while from glass cores having an index of refraction $n_{546}=1.62$ instead an aperture angle of 100° an angle of 130° is obtained.

Customary commercial aqueous dispersions may be employed and the dispersing agents may be removed at an increased temperature, preferably at 280–320° C., whereby a transparent, smooth film effective as an optical sleeve remains on the glass. Furthermore, it is surprising in this connection that a good optical contact of this material, known by itself as being very anti-adhesive, upon the smooth glass surfaces is obtained, even though the glass surface is not especially pretreated. This probably is to be attributed to the fact that the film surrounds the rod like a closed sleeve.

The light-conducting systems produced in accordance with the invention, in view of their extremely great aperture angle, open new possibilities of light conduction in the visible range, and above all in the ultraviolet range.

EXAMPLE

A carefully ungreased glass- or quartz-glass-rod with polished end surfaces is drawn perpendicularly upward with a uniform speed of 3.3 cm. per minute from an aqueous dispersion of a mixed-polymerizate made of tetrafluoroethylene and hexafluoropropylene (58.5% solid substance). The rod is put into a drying chamber having initially a temperature of 100° C. and whereupon the temperature is increased within a period of one hour to 320° C. This temperature remains unchanged for another period of one hour and then is reduced to room temperature. The disappearance of the clouding of the applied layer indicates the progress of the removal of the dispersion agent. Thereupon the rod is reversed and the other end of the rod not as yet coated, due to the required supporting of the rod, is now coated in the same manner. The smooth, transparent layer is removed from the polished end surfaces with a cutting edge.

The measured aperture angles with different core materials and wave-lengths have the following values:

| Core material | Wave length, nm. | Aperture angle |
|---|---|---|
| Quartz glass | 255 | $2\alpha_0 = 67 \pm 3°$ |
|  | 365 | $2\alpha_0 = 67 \pm 3°$ |
|  | 546 | $2\alpha_0 = 67 \pm 3°$ |
| Optical glass with good permeability at 365 nm. | 365 | $2\alpha_0 = 90 \pm 3°$ |
|  | 546 | $2\alpha_0 = 93 \pm 3°$ |
| Optical glass with good permeability in the visible range | 546 | $2\alpha_0 = 130 \pm 3°$ |

The wave-length dependency of the aperture angle lies practically within the measuring accuracy, as the wavelength dependency of the refractive value of core and sleeve is similar.

What we claim is:

1. In a light-conducting system, particularly for ultraviolet light, comprising light-permeable quartz glass rods or fibres provided with a coating of synthetic resin having an index of refraction which is smaller than that of said quartz glass and which is at least a few wave-lengths thick, the improvement wherein said synthetic resin comprises a transparent, highly fluoridized, aliphatic resin.

2. A light conducting system, according to claim 1, in which said synthetic resin comprises a mixed polymerizate made of tetrafluoroethylene and hexafluoropropylene.

References Cited
UNITED STATES PATENTS
3,010,357   11/1961   Hirschowitz _____ 65—LR WILLIAM D. MARTIN, Primary Examiner
D. COHEN, Assistant Examiner U.S. Cl. X.R.
117—126 GB; 65—Dig. 7